United States Patent
Carr et al.

(10) Patent No.: US 10,402,380 B1
(45) Date of Patent: Sep. 3, 2019

(54) INTERACTIVE USER INTERFACE FOR SCHEMA TRANSFORMATION

(71) Applicant: CARECLOUD CORPORATION, Miami, FL (US)

(72) Inventors: Michael R. Carr, Bremen, GA (US); William E. Henry, Dallas, TX (US); Alen J. Pulido, Miramar, FL (US); Joshua A. Siegel, Miami, FL (US)

(73) Assignee: CARECLOUD CORPORATION, Miami, FL (US)

( * ) Notice: Subject to any disclaimer, the term of this patent is extended or adjusted under 35 U.S.C. 154(b) by 0 days.

(21) Appl. No.: 15/975,317

(22) Filed: May 9, 2018

(51) Int. Cl.
| | |
|---|---|
| G06F 17/30 | (2006.01) |
| G06F 16/21 | (2019.01) |
| G06F 9/451 | (2018.01) |
| G06F 16/248 | (2019.01) |
| G06F 16/25 | (2019.01) |
| G06F 16/242 | (2019.01) |

(52) U.S. Cl.
CPC ............ G06F 16/213 (2019.01); G06F 9/451 (2018.02); G06F 16/248 (2019.01); G06F 16/2433 (2019.01); G06F 16/252 (2019.01)

(58) Field of Classification Search
CPC .................................................. G06F 17/30297
See application file for complete search history.

(56) References Cited

U.S. PATENT DOCUMENTS

| | | |
|---|---|---|
| 5,878,419 A | 3/1999 | Carter |
| 5,897,645 A | 4/1999 | Watters |
| 6,208,992 B1 | 3/2001 | Brückner |
| 6,631,519 B1 | 10/2003 | Nicholson et al. |
| 6,772,180 B1 | 8/2004 | Li et al. |
| 7,587,667 B2 * | 9/2009 | Scardina ............... G06F 17/272 715/230 |
| 7,703,099 B2 * | 4/2010 | Gaurav .................. G06Q 30/04 705/34 |
| 9,430,114 B1 * | 8/2016 | Dingman .............. G06F 16/211 |

(Continued)

OTHER PUBLICATIONS

Lawton, Vitria buys XMLSolutions to bolster SML-EDI translations, ITworld (2001). Retrieved from https://www.itworld.com/article/2797984/development/vitria-buys-xmlsolutions-to-bolster-xml-edi-translations.html.

(Continued)

*Primary Examiner* — Jeff A Burke
(74) *Attorney, Agent, or Firm* — Hunton Andrews Kurth LLP (57) ABSTRACT

According to an embodiment of the present invention, a system provides a graph that identifies data mapping rules for a data transformation type and comprises: a display interface configured to present a plurality of distinct node types, each with a distinct location and is displayed at corresponding a first display location, a second display location and a third display location on the display surface, a first distinct node type is a pure data type with one or more value output ports; a second distinct node type is a data mapping type with one or more value input ports and at least one output port; and a third distinct node type is a sequence instruction type with one or more stream input ports and at least one output data transform port; a computer processor that generates a rules configuration representing a graph construct; and a memory that stores the rules configuration.

18 Claims, 8 Drawing Sheets

(56) References Cited

U.S. PATENT DOCUMENTS

| | | |
|---|---|---|
| 2002/0111964 A1 | 8/2002 | Chen |
| 2002/0161907 A1* | 10/2002 | Moon .................. H04L 69/08 709/230 |
| 2003/0167444 A1 | 9/2003 | Zorc |
| 2005/0257193 A1* | 11/2005 | Falk .................. G06F 8/315 717/109 |
| 2007/0143320 A1 | 6/2007 | Gaurav |
| 2007/0143665 A1 | 6/2007 | Machiraju |
| 2007/0168464 A1 | 7/2007 | Noonan |
| 2007/0203921 A1 | 8/2007 | Gaurav |
| 2007/0203926 A1 | 8/2007 | Gaurav |
| 2007/0203928 A1 | 8/2007 | Machiraju |
| 2007/0204214 A1 | 8/2007 | Gaurav |
| 2008/0072160 A1* | 3/2008 | Gaurav .................. G06F 3/0482 715/758 |
| 2008/0168081 A1 | 7/2008 | Gaurav |
| 2014/0136961 A1* | 5/2014 | Mai .................. G06F 17/2264 715/249 |

OTHER PUBLICATIONS

Stylus Studio. Translating X12 documents to XML. Retrieved from http://www.stylusstudio.com/edi/X12-translate.html.

Stylus Studio. EDI to XML Mapping in Stylus Studio. Retrieved from http://www.stylusstudio.com/videos/convert-to-xml2/convert-to-xml2.html.

Ricker, et al., XML Solutions—XML Representation of X12 EDI, 25 pgs. Retrieved from http://www-bcf.usc.edu/~anthonyb/B2B_XML/docs_pdf/XMLSolutions_XML-EDI.pdf.

IBM Knowledge Center-X12 Sample. Retrieved from https://www.ibm.com/support/knowledgecenter/en/SSKM8N_8.0.0/com.ibm.etools.mft.samples.x12.doc/doc/overview.htm.

The Scala Programming Language. Retrieved from https://www.scala-lang.org/.

* cited by examiner

Figure 8

INTERACTIVE USER INTERFACE FOR SCHEMA TRANSFORMATION

CROSS REFERENCE TO RELATED APPLICATION

This application is related to U.S. patent application Ser. No. 15/975,306 filed concurrently on May 9, 2018.

FIELD OF THE INVENTION

The present invention relates to an innovative schema that generates a memory structure for a specific transaction type that preserves object relationships and further relates to an interactive user interface for creating underlying mapping rules relating to the schema.

BACKGROUND OF THE INVENTION

Electronic Data Interchange (EDI) refers to an electronic exchange of business documents in a standard electronic format between trading partners. The most common documents exchanged via EDI are purchase orders, invoices and other payment documents. Because EDI documents are processed electronically by computers, a standard format is necessary so that the computers will be able to process the documents. The standard format describes what each piece of information is and in what format. The exchange of EDI documents is oftentimes between two different companies, referred to as trading partners or business partners. For example, in the healthcare industry, a healthcare provider and payer (such as an insurance company) are trading partners.

ANSI X12 represents a standard data interchange format across industries. In the X12 EDI standard, documents are assigned a 3-digit number for invoices, catalogs, healthcare claim, purchase order, etc. X12 uses serialization which requires a serialized sequence of values where delimiters separate elemental information. Serialization has no notion of an inherent structure hierarchy and therefore relationships among the serialized data stream are ill-defined and ill-derivable without a users inherent knowledge or unique dedicated processing of a pre-identified serialized stream.

To utilize X12, a programmer must characterize each transaction uniquely, requiring the programmer to be skilled in understanding X12 format, especially in the context of the specific transaction the data stream is to be processed, making and interpreting the calls and also writing the transaction processing. The current methodology is complex, non-intuitive, non-relational, and requires unique process calls throughout the workload.

Current systems rely on hard coded parsing rules, brittle data transformation processes and extensive human intervention for troubleshooting an issue when a process breaks down, thereby causing a manner that a change in the expected data stream or a change in the process to be performed is hard to anticipate and therefore a changed data stream or a changed process would require a distinct new set of hard-coded parsing rules. Single purpose hard coding the parsing rules creates maintenance havoc for engineers when any update to a schema is needed. Also, implementing a new functional process schema requires rewriting a major chunk of code and thereby creating a one-to-one relationship between a parsing engine and a particular functional process schema.

The brittle code problem was compounded by the fact that an interchange between trading partners may have a particular set of rules established. For example, an EDI business analyst is usually required to troubleshoot anything wrong or even a simple update to the interchange process, since they know the contract was established. Special purpose hard coded rules also leads to difficulties maintaining one-off rules that affect an entire code base.

These and other drawbacks may be present in current systems.

SUMMARY OF THE INVENTION

Accordingly, one aspect of an embodiment of the present invention is to address one or more of the drawbacks set forth above. According to an exemplary embodiment, a method comprises the steps of: receiving, via an electronic input, a transaction having a serialized structure; identifying, using a computer processor, a transaction type for the transaction; identifying, using the computer processor, a schema for the transaction type; retrieving, from a memory, a schema correlated transform process wherein the schema correlated transform process transforms the serialized structure to a hierarchical structure; and parsing, using the computer processor, the transaction into a hierarchical format based on the schema.

According to another exemplary embodiment, a system comprises: an electronic input that receives transaction related data; a memory that stores schema related data; and a computer processor coupled to the electronic input and the memory and further configured to: receive, via the electronic input, a transaction having a serialized structure; identify a transaction type for the transaction; identify a schema for the transaction type; retrieve, from the memory, a schema correlated transform process wherein the schema correlated transform process transforms the serialized structure to a hierarchical structure; and parse the transaction into a hierarchical format based on the schema.

According to yet another exemplary embodiment, a system provides a graph that identifies data mapping rules for a data transformation type. The system comprises: a display interface configured to present a plurality of distinct node types, each with a distinct location and is displayed at corresponding a first display location, a second display location and a third display location on the display surface, a first distinct node type is a pure data type with one or more value output ports; a second distinct node type is a data mapping type with one or more value input ports and at least one output port; and a third distinct node type is a sequence instruction type with one or more stream input ports and at least one output data transform port; a computer processor that generates a rules configuration representing a graph construct; and a memory that stores the rules configuration; wherein the display interface is coupled to the computer processor and the memory.

According to yet another exemplary embodiment, a method provides a graph that identifies data mapping rules for a data transformation type. The method comprises the steps of: presenting, via a display interface, a plurality of distinct node types, each with a distinct location and is displayed at corresponding a first display location, a second display location and a third display location on the display surface, a first distinct node type is a pure data type with one or more value output ports; a second distinct node type is a data mapping type with one or more value input ports and at least one output port; and a third distinct node type is a sequence instruction type with one or more stream input ports and at least one output data transform port; generating, via a computer processor, a rules configuration representing a graph construct; and storing, via a memory, the rules configuration; wherein the display interface is coupled to the computer processor and the memory.

According to yet another exemplary embodiment, a method generates a graph that identifies data mapping rules for a transaction type. The method comprises the steps of: identifying a transaction type; retrieving, using a computer processor, a set of nodes to construct a graph for the transaction type; providing, via the graphical user interface, a graphing construct and a plurality of graphing actions; the graphing construct comprising: an input that selects at least one data node from the set of nodes, the data node having one or more associated data elements; a linking input that links a data element of the data node to a corresponding input of a relationship node; a sequence input that identifies a sequence for a plurality of relationship nodes; generating, using the computer processor, a rules configuration representing the graphic construct; and storing, in a memory, the rules configuration.

The computer implemented system, method and medium described herein provide unique advantages to trading partners, business analysts and other users, according to various embodiments of the invention. The innovative system provides an interactive user interface that enables users to graphically build mapping rules for a specific transaction type. The mapping rules define how elements in a data object relate to elements in another object in a different format. The system interprets the rules and builds the data according to the rules that preserve object relationships (e.g., parent-child relationships). The system converts serialized data into a standard format that is useful for object oriented programming and content driven configuration. This eliminates programming effort that would normally takes weeks and months to effectuate. The innovative system and method provides efficiencies by reducing, if not eliminating, significant coding effort and time. These and other advantages will be described more fully in the following detailed description.

Current systems focus exclusively on an X12 to XML, mapping, which is limited to a mapping between two serialization formats. In contrast, an embodiment of the present invention is directed to transforming a serialized format (e.g., X12) into an internal in memory tree structure using DSLs as the processing layers (e.g., X12→DSL processing layer→internal tree structure).

DSL represents Domain Specific Language, which is a programming language abstraction over a specific problem set, e.g., a programming language designed around a specific problem. In accordance with an embodiment of the present invention, it is a programming language designed to solve the problems in the EDI domain, e.g., creating EDI messages from data, processing EDI messages, validating them, applying data transformations, etc. It is Domain Specific because it is limited to solving a specific problem as opposed to a GPL (General Purpose Language) that solves any computational problem.

Unlike current systems, the present invention eliminates the need for alternative serialization formats. An embodiment of the present invention allows for iteration over a EDI message itself to ensure that the system is producing an object in memory at runtime that matches what was described in the EDI files data values in a single pass following the EDI conventions. This innovative technique allows for handling of a large EDI file for example as an array of objects with hierarchy as opposed to first serializing the entire file as XML, in order to be able to process it as objects in code.

An embodiment of the present invention runs directly on an in-memory object representation of the EDI messages as the serialization format. Accordingly, the innovative approach specifically avoids conversion to alternative schemas and/or formatters which is inevitably a source of error as the functional needs of the data and the business logic of the software producing the EDI requests diverge over time.

The innovative system executes code that runs explicitly against the EDI structure, rather than an alternative XML representation, which is then separately serialized and de-serialized to objects. According to one exemplary embodiment, the system uses Scala to handle EDI messages as an MPP (Massive Parallel Process) which greatly enhances speed and accuracy by avoiding an additional conversion required by current systems.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

An embodiment of the present invention recognizes that a significant technical challenge in correctly parsing an X12 EDI message is that its serialization scheme does not reveal the hierarchical structure of the message. This makes it unique as compared to other formats, e.g., JSON, XML, that are by their language definition modeled in a hierarchical manner meaning outside a particular schema the hierarchical relationships may be easily determined. An embodiment of the present invention is directed to a schema definition language and an expression scheme that creates a schema that generates an in-memory tree structure for a specific transaction type. Schema generally refers to an organization of data into a particular structure, relationship and/or meaning. The schema preserves object relationships to facilitate performing operations on any EDI message. Another embodiment of the present invention is directed to an innovative graphical user interface that enables a user, such as a business analyst, to graphically arrange data mapping rules without programming knowledge and experience.

Figure 1:
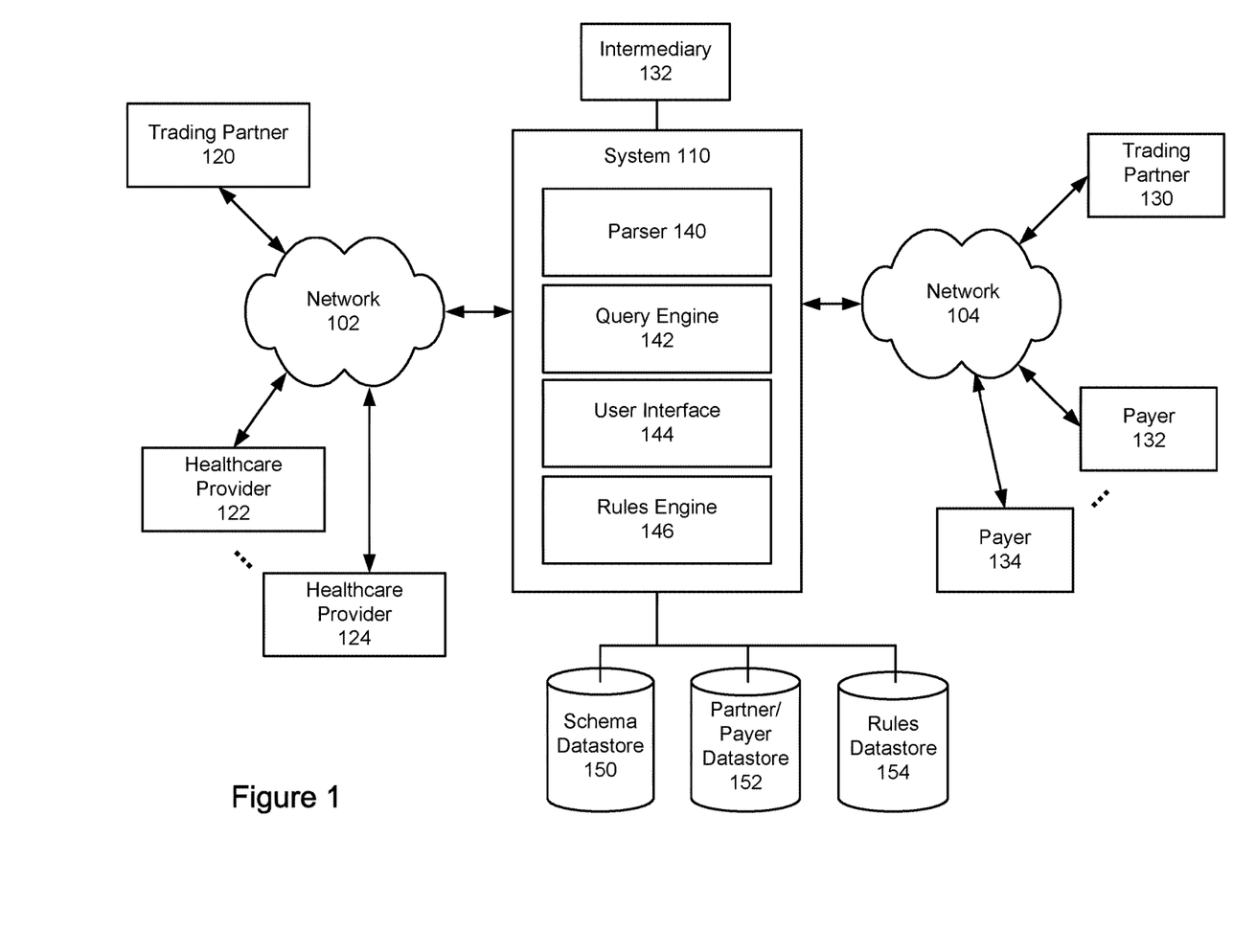
FIG. 1 is an exemplary diagram of a system for implementing a schema transformation, according to an embodiment of the present invention.

FIG. 1 is an exemplary diagram of a system for implementing a schema transformation, according to an embodiment of the present invention. Trading Partners 120, 130 may communicate directly or indirectly via an Intermediary 132. Trading Partners may represent any entity, company, agency, organization, provider, etc. According to an exemplary environment, Healthcare Providers 122, 124 and Payers 132, 134 may communicate with System 110 via communication Networks 102, 104. Transaction sets may be sent from Healthcare Providers, shown by 122, 124, to Payers, such as Insurance Companies, shown by 132, 134. Intermediary 132 may facilitate claims processing between healthcare providers and insurance companies. In this example, Intermediary 132 may represent intermediary billers, clearinghouses and/or other third party entity. For direct communications, System 110 may be integrated with systems associated with one or more trading partners.

Transaction sets may represent business documents, such as a purchase order, invoice, shipping notices and/or other payment related documents. In EDI, a transaction set may include data elements, segments and envelopes. As shown in FIG. 1, a transaction set may be used to submit healthcare claim billing information from Healthcare Providers 122, 124 to Payers 132, 134. Data elements may represent the individual items of information within a transaction document. For example, within a purchase order or an invoice, data elements may include city, state, country, etc. Each data element in a transaction set is defined in the EDI Standard by the type of data it represents. A segment in an EDI transaction set is a group of related data elements. An EDI envelope may represent a collection of transaction sets.

X12 protocol is an EDI standard developed for the electronic exchange of machine-readable information between businesses, such as trading partners. An X12 message has a message structure that indicates how data elements are organized and how they relate to each other for a particular EDI transaction. In X12, a loop is a set of related segments in a Transaction Set. Segments are grouped together to conveniently represent a block of related information. For example, loop types may include a Name/Address loop. Segments may be composed of one or more data elements, which may be equivalent to fields in a record. Segments start with a two or three character segment tag which identifies the segment. And, data elements are separated by a delimiter character.

Healthcare claims and billing payment information may be transmitted between payers where each payer may have a its own distinct payment responsibilities and roles. In this example, a coordination of benefit responsibilities may be required. In addition, information may be transmitted between payers and regulatory agencies to monitor rendering, billing and/or payment of healthcare services within a specific segment. Other variations may be implemented in accordance with the various embodiments of the present invention.

System 110 may include various components, modules and interfaces to support schema transformation in accordance with the various embodiments of the present invention. System 110 may include Parser 140, Query Engine 142, User Interface 144 and Rules Engine 146. System 110 may access various forms of stored data, represented by Schema Datastore 150, Partner Datastore 152 and Rules Datastore 154. Schema Datastore 150 stores and manage schema information for various transaction types. Partner Datastore 152 may store and manage partner specific data, such as unique payer instructions. Rules Datastore 154 may store and manage data mapping rules for various transaction types. Datastore may represent any type of memory component.

According to an embodiment of the present invention, System 110 comprises a Parser 140 that parses through massive files containing EDI messages from trading partners, such as payers, insurance companies, etc. Parser 140 may translate the messages into a tree structure and execute specific business logic based on message parameters. Moreover, Parser 140 may be built under an API that recognizes that a message coming from a specific trading partner, e.g., XYZ Insurance company, has a certain profile and should be treated differently than a different trading partner, e.g., ABC Insurance Company.

An embodiment of the present invention may leverage core functional programming concepts and distributed computing to massively scale the processing of EDI transactions. Parser 140 may parse each EDI transaction into a recursive hierarchical data structure (e.g., a tree structure) that preserves parent-child relationships in the data as defined by the schema used in parsing the message. For example, the system may receive a batched EDI transaction of N number of transactions, split the EDI transactions out thereby preserving any shared data, and then split the individual transactions for further processing. The individual transactions may be distributed in parallel in a computing cluster.

System 110 may include a Query Engine 142 for performing operations and actions. An embodiment of the present invention is directed to a unique query language (e.g., EDI Query Language (EQL)) that defines a layer of abstraction that allows a user with knowledge of EDI business processes to define operations based on various needs. Through Query Engine 142, the query language provides users, such as business analysts, access as well as the ability to modify and transform any data in and out of an EDI message. Also, Query Engine 142 may use EQL language that is designed around a single corpus of records with heterogeneous schemas. For example, this refers to the query engine treating available transactions the same (or in a similar manner). It is only after a defined schema specific to that transaction type is applied to build the data tree for processing that the system recognizes what the data actually is. According to an embodiment of the present invention, EQL has the same operators for every schema type. The schema itself provides operation validation.

Query Engine 142 may also provide access to data within an X12 message including how to find data within the message, with a recursive structure. The innovative schema transform utilizes a flat-map algorithm that allows the system to traverse the recursive message structure using common terms that a business analyst would use to see what is in an EDI message. In other words, the system enables any user (specifically a non-programmer) to take an X12 message, parse the contents and instruct a processing engine what to do with the message or data elements within the message. For example, a user may instruct the processor engine to "Go to the second loop of the 3rd segment and if the field value is "Dog", then refer to the header to retrieve the message "Bone".

According to an embodiment of the present invention, results of a flat-map algorithm may be business logic driven. For example, once the data is in a correspondent transaction dependent hierarchical structure (e.g., in-memory tree structure), EQL transformation operations may be applied to data nodes in the in-memory tree structure to transform the data into any structure requested or needed by a set of business requirements. EQL transformations may involve: (1) selecting the data nodes; (2) applying a transformation (mapping) function to the selected data nodes; and (3) combining (flattening) resulting transformations to create the desired business objects.

"2100D"*|*"2100C"/sub"2110"/EB≤≥(e4, e3)>>{Benefit(_, _)}

An example may involve: Select Loop 2100D or 2100C whichever is present, then select subloop 2110, then select Elements 1 and 2 (e4, e3) on EB segment. Then Transform the data in e4, e3 into the Benefit object. In this case, the data from e4 and e3 is simply copied into a Benefit object.

|
   '2100C'/'2110' all {loop=>
   loop/EB≤≥(e1, e3) all {Benefit(_, _)}
}

Another example may involve flattening (or combining) results into single list. The system may use an operator at the 2110 level, and the EB segment level flattening two levels of nesting into a single list. Sometimes X12 Data may be nested into a list of lists. For example, in a list of persons (first level), each person may have many addresses (second level). Depending on the business logic needed, the processing may involve going to the second level data (Addresses) and combining (flattening) into a single list. In the case of X12, a Loop (first level) may have many sub-Loops (second level). EQL was built to support this use case at its core because of the recursive nature of the underlying data structure.

For example, for "Get the value of Element 9 from the Segment NM1 in Loop 2100A," EQL may use a path based syntax with the path "/" operator to traverse down the tree. Also the get operator "/@" is used to retrieve the value. "2100A"/"NM1"/@ e9.

Another example may involve: select Elements 4, 3, 8, 9 from NM1 segment in Loop 2100C and transform them into the Person structure. This example uses a dynamic select operator "<|>" and a transform operator ">>" "2100C"/"NM1" (e4, e3, e8, e9)>>{case Seq(n4, n3, n8, n9)=>Person (n4, n3, n8, n9)}.

Another example may involve: select all 2100C loops where Element 4 of segment NM1 is equal to "VICENTE" or where Element 3 is equal to "JONES". In this example, "select all" would be caused by the subsequent operator >>> after the selection. "2100C">< (loop=>loop/"NM1"/e4 is "VICENTE" Or (loop/"NM1"/e3 is "JONES"))>>>( . . . ). This example employs the use of the where operator ">< " to conditionally select loops within an X12 message based on the result of the boolean "is" operator "2100C">< (loop=>loop/"NM1"/e4 is "VICENTE" Or (loop/"NM1"/e3 is "JONES")).

System 110 may also provide the ability to create mapping rules via an Interactive User Interface 144. The rules may be stored and managed via Rules Engine 146.

As shown in the flowcharts in FIGS. 2-4, as described below, a business analyst may create and manage rules and routing configurations. A routing configuration identifies what mapping rules to apply to an incoming message based on which entity sent the message and where the message is sent to. In this scenario, which may include a validation process, the business analyst may monitor results of a transaction and then address relevant rules as issues are detected. For example, the business analyst may receive notice of an issue (e.g., transaction failure) and identify a rule associated with the transaction. In response, the business analyst may modify or otherwise address the rule (or rules) that caused the transaction to fail. This facilitates corrections and modifications to rules and thereby avoids the same issues from recurring in the future. Notably, the business analyst is not required to interfere with the send and/or receive lifecycle of a transaction. An embodiment of the present invention enables business analysts to be considered content managers that manage the data and configuration (e.g., rules, routing configurations, etc.) applied to a transaction but do not interfere with the process itself. A routing configuration may be applied to every incoming request to know what mapping rules to apply based on who sent it and where it is going.

Figure 2:
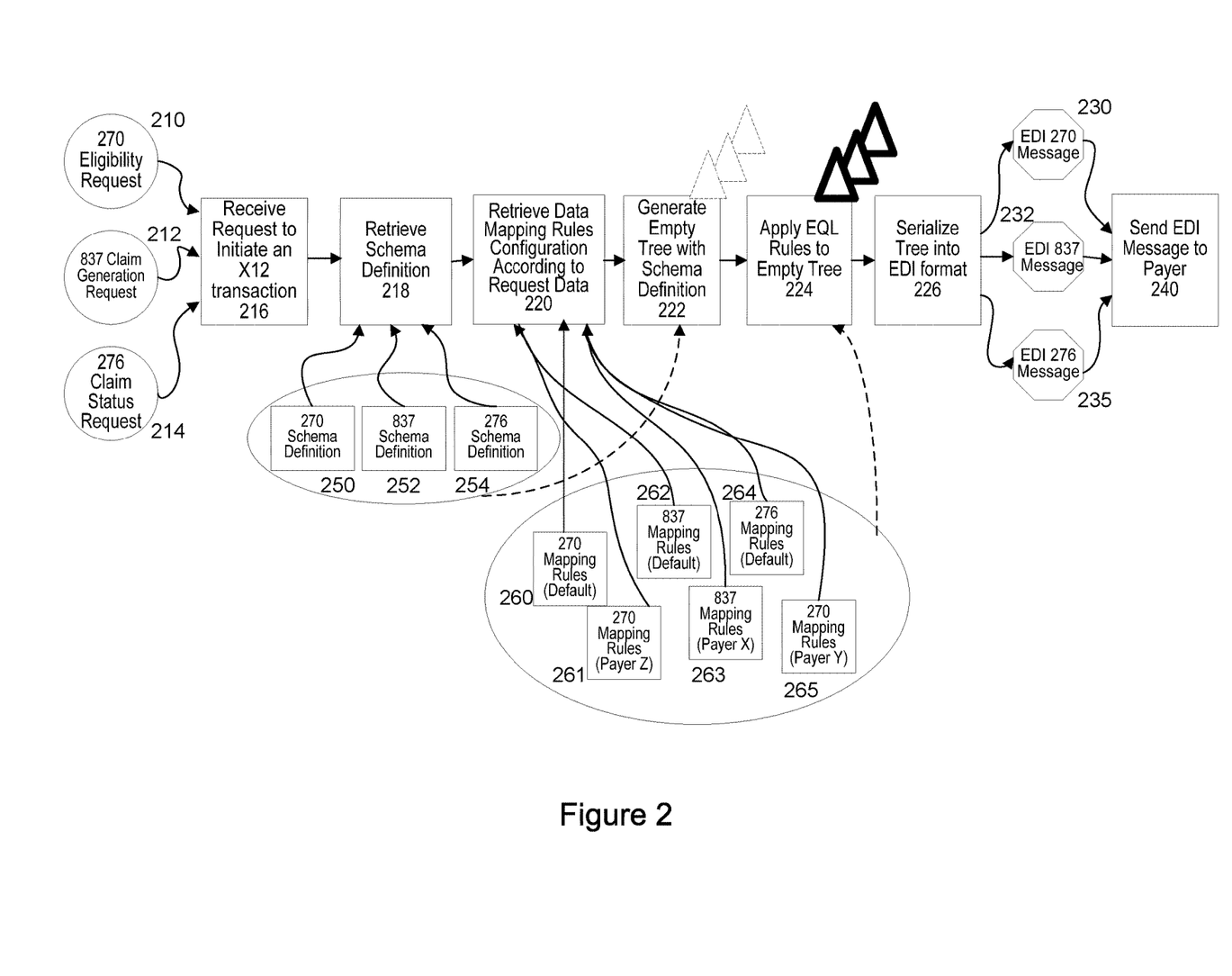
FIG. 2 is a flowchart illustrating an exemplary mapping flow, according to an embodiment of the present invention.

FIG. 2 is a flowchart illustrating an exemplary mapping flow, according to an embodiment of the present invention. An embodiment of the present invention may receive a transaction set from a provider, such as a healthcare provider. The transaction set may be more than one if they are batched. The transaction set would have a single transaction type. The system may apply the steps of FIG. 2 to various other types of transactions in other industries. The transaction set may include various transaction requests in X12 format. In this example, three exemplary X12 transaction requests are shown: 270 Eligibility Request (shown by 210); 837 Claim Generation Request (shown by 212) and 276 Claim Status Request (shown by 214). As shown at step 216, transaction requests may be received to initiate an X12 transaction.

Figure 5:
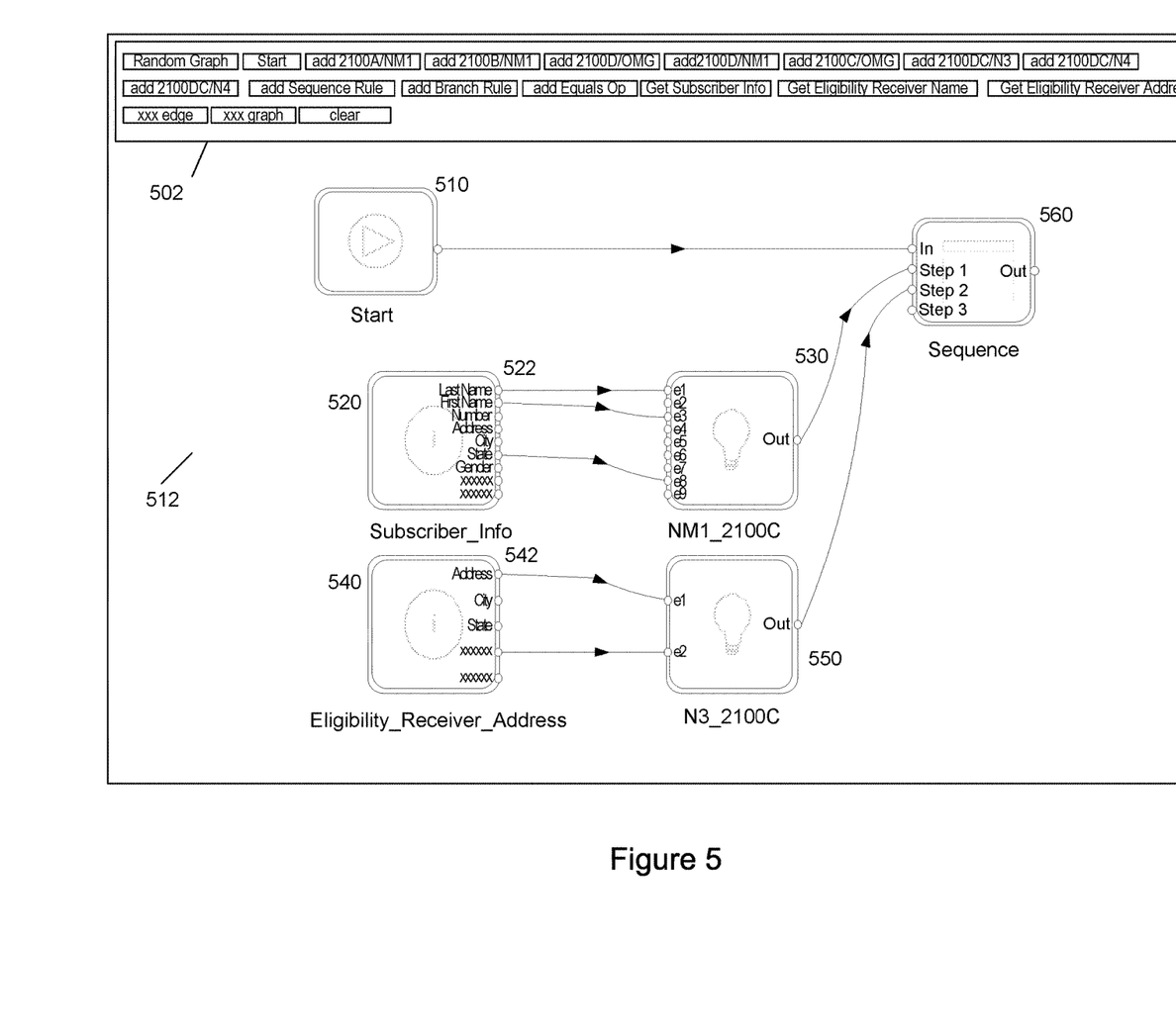
FIG. 5 is an exemplary user interface, according to an embodiment of the present invention.

At step 218, schema definition is retrieved according to a transaction type, identified by each transaction request. Each transaction type has a corresponding schema definition, represented by 250, 252 and 254, respectively. The schema definition instructs a Parser how to build in-memory tree structure for a particular transaction. For example, a received eligibility request 210 may include a corresponding routing configuration. The routing configuration may include a transaction type and may also include payer, requestor and/or other data. The system may retrieve a graphing construct with the corresponding routing configuration. An exemplary graphing construct is shown in FIG. 5.

According to an embodiment of the present invention, a schema definition may be written with a Schema Definition language. The schema definition may be used to generate and validate in-memory tree structure for a particular transaction. The Schema Definition language may be used to define a schema. The schema is used to generate the in-memory tree structure when parsing the EDI transaction. EQL operations may be executed against the in-memory tree structure. EQL facilitates accessing, inserting and validating values in an EDI transaction. EQL may performs operations, such as create, read update and other transformation operations on any EDI message.

Schema Definition Language provides a visual declarative way for a user, such as a business analyst, to use the jargon of the EDI specification documents to define rules to process EDI compliant messages. For example, a validation or definition published in a X12 EDI Implementation guide may be implemented using Domain Specific Language (DSL). DSL represents a programming language abstraction of over a specific problem set. EDL (Edison Schema Definition Language) addresses the problem of defining an Edison X12 Schema by exposing user friendly operators that closely resemble the jargon used in an X12 implementation Guide. Moreover, EQL is also another DSL because it is a solution to the problem of manipulating X12 data.

Because trading partners usually have preferences in implementing EDI, the preferences are specified in implementation guides. An X12 implementation guide exists for every supported transaction type. Accordingly, the meaning of loops, segments and elements are described in the implementation guide for each transaction type.

According to an embodiment of the present invention, the Schema Definition Language may mirror the way an EDI transaction is defined or described in an X12 implementation guide. The Schema Definition Language is geared towards the business analyst to minimize interaction with a developer. It further allows an EDI analyst to input an implementation guide to the Parser to interpret it. Because there are no restrictions on what can be defined, various concepts in the implementation guide may be modeled in the language. This enables an EDI business analyst to easily understand and use the system. This would not be the case if the system used XML for instance. Accordingly, Schema Definition Language facilitates the definition of parsing rules by an EDI business analyst and other users. The system may also incorporate a natural language processor that interprets the implementation guide (as well as other sources of data) for each trading partner (e.g., payers) to generate rules data for the Rules Engine.

At step 220, data mapping rules configuration is retrieved according to request data. Request data may include payer, requesting entity, transaction type, etc. Data mapping rules may be represented by 260, 262 and 264. Data mapping rules may correspond to a specific payer, as illustrated by 261, 263 and 265. The mapping rules provide instructions on how to map data from a request into a particular in-memory tree structure.

At step 222, an in-memory tree structure may be generated with each schema definition, represented by 250, 252 and 254. At step 224, Mapping Rules are applied to populate each in-memory tree structure with data received in each request (represented by 210, 212, 214), respectively. The in-memory tree structure enables EQL to insert the data received that maintains data relationships so that when the tree is serialized into a target format, such as X12 EDI, the data will be correct with valid values.

At step 226, the in-memory tree structure is serialized into a target format, such as X12 EDI format. The serialized format is represented by EDI 270 Message (shown by 230); EDI 837 Message, shown at 232 and EDI 276 Message, shown at 234. In the EDI X12 standard, each message type has a specific number assigned to it instead of a name. For example, an eligibility, coverage or benefit inquiry is EDI 270, a healthcare claim is EDI 837 and a healthcare claim status inquiry is EDI 276. The EDI messages may be consolidated and otherwise formatted for transmission to a receiving entity, such as a Payer at 240. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

An embodiment of the present invention is directed to transforming a serialized sequence of values of a non-hierarchical group/segment/element structure into a hierarchical structure, based on a preset structure set of instructions (rules). The serialized description may comprise rows of individual contributing elements, which may be serialized in delimiter line segment form.

A rule set may be a user selected aggregation of specific rules that when arranged together by a user defined arrangement represents an EDI data exchange set. These sets may be disassociated from each other, where a validated rules sequencer may aggregate the element information together.

The rule(s) may define (i) a set of data value associations (ii) instruction hierarchies and (iii) a set of sequences of creating the hierarchies. The rules may establish a tree of key/value pairs constructed in the hierarchical form that maps to the rows of the original serialized elements. In addition, each rule may have an associated label, which permits the rule to be called in combination with other labeled rules for subsequent rule functions.

Figure 3:
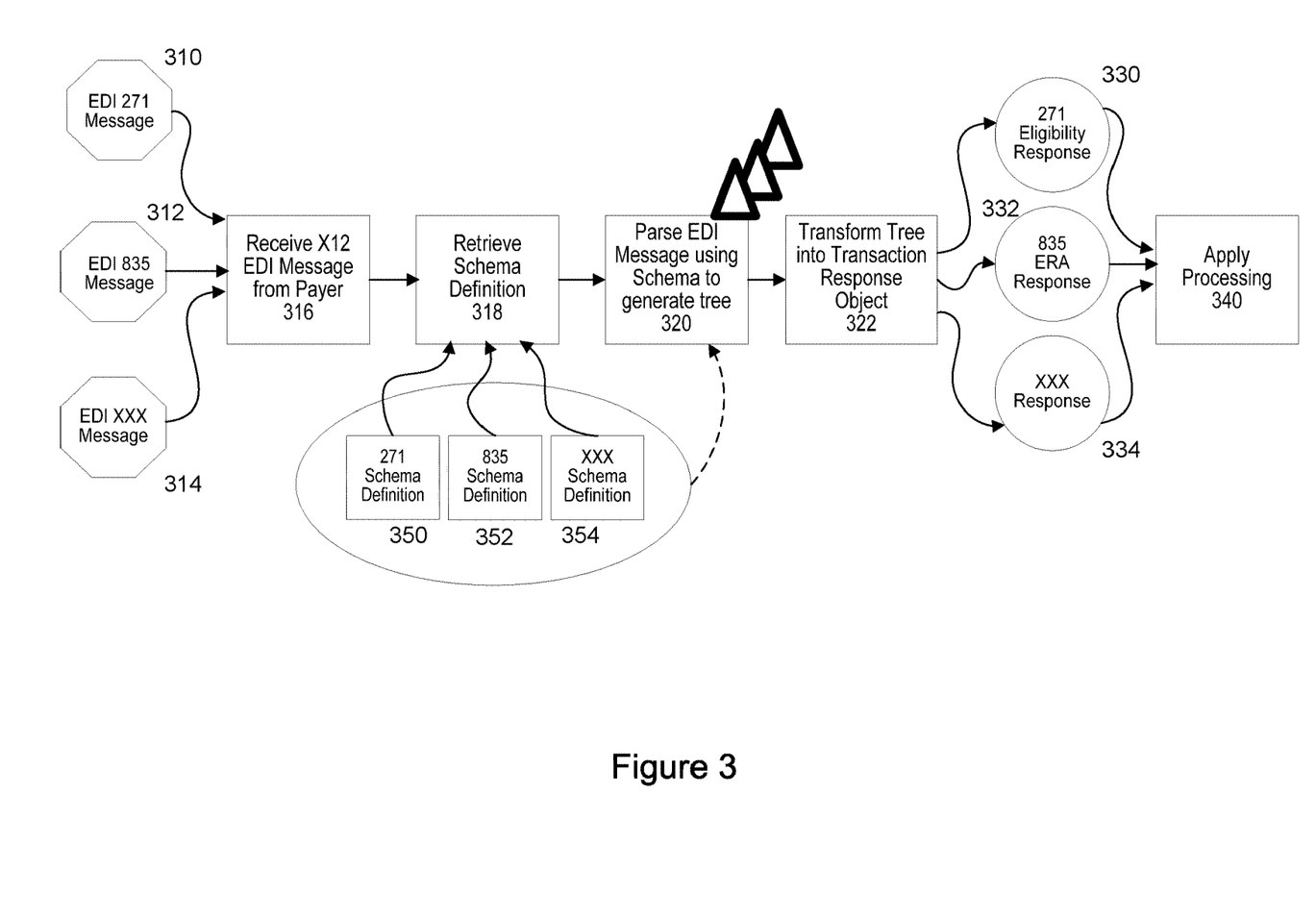
FIG. 3 is a flowchart illustrating an exemplary mapping flow, according to an embodiment of the present invention.

FIG. 3 is a flowchart illustrating an exemplary mapping flow, according to an embodiment of the present invention. An embodiment of the present invention may receive EDI messages and generate a response. EDI messages may be received from a trading entity, such as a payer, an insurance company, etc. The system may apply the steps of FIG. 3 to various other types of messages in other industries. In this example, three exemplary EDI messages are shown: EDI 271 Message (shown by 310); EDI 835 Message (shown by 312) and EDI XXX Message (shown by 314, where "XXX" is a placeholder for a specific EDI Message). At step 316, the system receives X12 EDI messages from a payer. At step 318, the system may retrieve schema definitions. This may be performed after examining ST01 and/or ST03 element (and possibly other elements). Each message type has a corresponding schema definition, represented by 350, 352 and 354, respectively. Every X12 message has a transaction control segment that denotes its transaction type, for example, ST*270*0001*005010X279A1, that segment is delimited by the * character so there are 3 discrete values 270, 0001, and 005010X279A1 refer to by their index respectively, ST01, ST02, ST03. To know what transaction it is, the system looks at ST01 (270) and ST03 (005010X279A1), which indicates, in this case, the transaction is an eligibility request x12 transaction.

At step 320, the EDI message may be parsed using a corresponding EDI schema definition to generate an in-memory tree structure with data received from the payer. This enables EQL operations to be executed against an in-memory tree structure. FIG. 3 illustrates querying and transforming an in-memory tree structure into any data structure or object, such as an eligibility response object. At step 322, the in-memory tree structure may be transformed into a transaction response object using EQL. The transaction objects may be represented as: 271 Eligibility Response (shown by 330), 835 ERA Response (shown by 332) and XXX Response (shown by 334, where "XXX" is a placeholder for a specific EDI Response). At step 340, processing may be performed, such as actions including save, return to user, etc. The processing may include data aggregation from one or more external sources. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
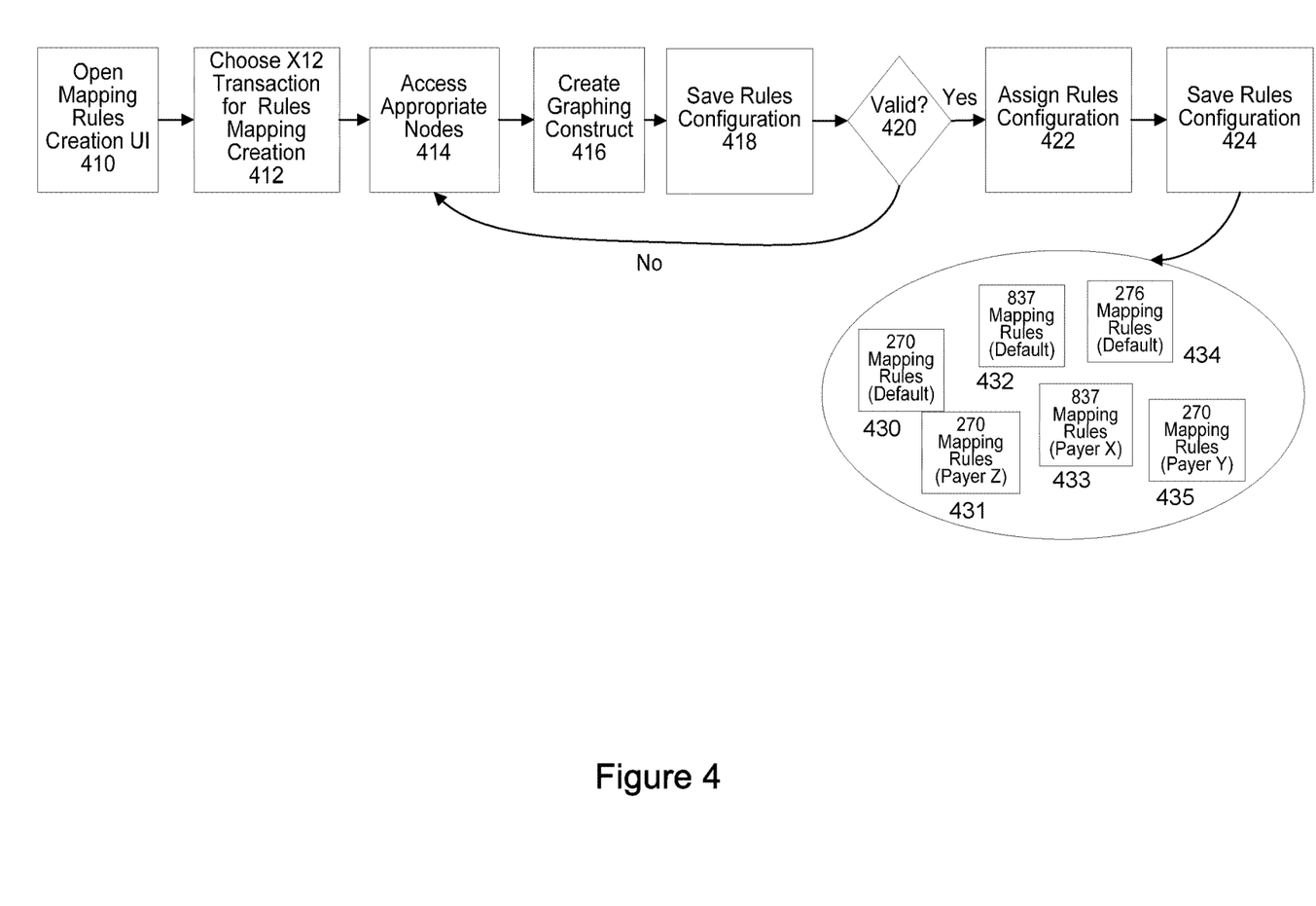
FIG. 4 is a flowchart illustrating an exemplary mapping rules creation flow, according to an embodiment of the present invention.

FIG. 4 is a flowchart illustrating an exemplary mapping rules creation flow, according to an embodiment of the present invention. At step 410, a user may initiate a mapping rules creation user interface. The mapping rules creation interface enables a user to create rules. Exemplary interfaces are shown in FIGS. 5-8, as described in greater detail below. At step 412, the user may select X12 transactions for rules mapping creation. At step 414, the user may access appropriate nodes. The nodes may be derived from the transaction type. At step 416, the user may create a graphing construct using the user interface. At step 418, the user may save a rules configuration corresponding to the graphing construct. At step 420, the user interface may determine whether the rules are valid. If not, the user may respond accordingly at step 414. Otherwise, the user may assign the rules configuration to a set of payer/client combinations for the transaction, at step 422. At step 424, the rules configuration may be saved. The rules configuration may then be used to generate mapping rules, as shown by 430-435. Default Mapping Rules may refer to a generic mapping rule for a transaction. The system may implement a default mapping rule if the system cannot identify a more specific one based on the identified attributes For example, the attributes may be defined in an incoming request based on client, the payer it is going to and transaction type. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

An embodiment of the present invention is directed to implementing a Schema Definition Language to establish a set of EDI Query Language (EQL) constructs that (in the aggregate) represent a set of identified X12 groups (e.g., loops) of segments. These segments have meaning for a trading partners within a workflow. The Schema Definition Language defines schema that represents a fixed set of object relationships that may be represented in graphical form via a user interface. The user interface creates a graph representation of a transformed X12 format. The graph representation may be auto-generated using an XML structure. For example, Schema definitions in XML format may be published by an X12 Standards group.

The user interface may provide various operations represented by graphing node types, such as Start, Data Retrieve, Data Tree Map, and Sequence Instructions. The Start node type represents an initiation of a sequenced event and may be linked to a Sequence Instructions step. The Start node is a hint to the user as to the beginning of the to be create sequenced events. It may or may not correlate to an actual sequence instruction. The Data Retrieve node type may identify a particular group of data elements (e.g., key-value pairs). In this example, each data element is mapped to a corresponding element in a Data Tree Map node type. Data Tree Map node type may represent a particular X12 construct, where the X12 construct is associated with a set of identified segments. The Sequence Instructions node type represents and acts as a guiding parser that sequences a state machine that takes the Data Tree Map node type outputs and in a designated order constructs a tree of valid X12 segment representations. Upon completion, the system may initiate a validation process. The validation process may be executed to identify data type errors in a constructed tree.

An embodiment of the present invention may support other various node types. For example, assertions may enable the system to run predicates off a tree and then take an action. An example may include "if segments 2100C/N4 and 2100C/N3 have data then run an action (Delete 2110C/EQ segment)." For example, rules may only be applied if a certain condition is met. In the example above, the condition is that segments 2100C/N4 and 2100C/N4 have data, if this condition is true, then Segment 2110C/EQ may be deleted so it will not appear in the final transaction.

Other node types may execute rules including: "For Each Loop" Rule, Execution Rule, Conditional Rule, "Is Not Blank?" Rule, and Conditional Execution Rules. Other node types may include Value nodes and Segment Mapping Nodes. A node with a "For Each Loop" Rule may receive a list of data objects through a "list" port and a X12 Loop and then applies operations connected to an "exec" port on that lap using each data object in the list as its input. A node with an Execution Rule may apply the X12 operation hooked up to its "exec" port. A node with a Conditional Rule may apply either the operations connected to its true or false out ports depending on a result of a Boolean condition. A node with an "Is Not Blank?" Rule may receive an input and check if it does not have data and output "true." If the input is blank, the node will indicate "false." A node with a Conditional Execution Rule may only execute an operation hooked into its "exec" port if the condition attached to it is true. Values nodes retrieve data from a user request object. For example, value nodes may retrieve a payer responsibility sequence number code and a group number of the Subscriber. A Segment Mapping Node maps each of its inputs to a corresponding element. Segment mapping nodes are available for each segment in a particular schema. Other variations may be implemented.

FIG. 5 is an exemplary user interface, according to an embodiment of the present invention. As shown in FIG. 5, the user interface enables a user to generate data mapping rules by selecting various nodes and drawing a relationship between the selected nodes, using a Guided User Interface metaphor on a display device controlled by a mouse, a trackball, a stylus or other types of user interface devices, all supporting user interactions. In another exemplary user interface, the user may select two nodes and instruct a command that links the two nodes. In another exemplary user interface, the user may call out (e.g., text entering, location entering, speaking, etc.) two nodes to be connected. Panel 502 presents a set of possible node types based on a transaction type. The system may have this set of node types pre-populated, the user may designate specific node types to be made available, or other mechanisms making the node types available to the user. In another exemplary user interface, the node types may be made available to the user using one or more many representations, that may include a pull down menu, a Guided User Interface drawer metaphor, search bar to request a node type, etc. For example, the possible node types may be extracted from a set of mapping operator instructions which may be a transcribed version of an X12 definition sequence that was pre-generated. The various available nodes may be used to build a relationship graph with inputs and outputs defining relationships between and among the various nodes.

Interface 512 provides an interactive display where a user may select various nodes from Panel 502 to create and define a specific rules set. For example, a user may select from various node types including Start, Data Retrieve, Data Tree Map and Sequence Instruction. In accordance with the various embodiments of the present invention, a user may interact in various ways to create and define rule sets. For example, a user may interact with the various nodes by selecting and pulling (e.g., drag-and-drop) the nodes into the Interface 512.

In this example, Start 510 represents a start node and represents an initial start point. Subscriber_Info 520 represents a Data Retrieve node. Subscriber_Info 520 may represent data elements, as shown by 522. The data elements may be mapped to corresponding elements of a Data Tree Map, NM1_2100C, as shown by 530. In this example, "Last Name" is mapped to e1, "First Name" is mapped to e3, and "State" is mapped to e8. Eligibility_Receiver_Address 540 represents a second Data Retrieve node that includes a set of data elements, as shown by 542. The data elements may be mapped to corresponding elements of Data Tree Map, N3_2100C, as shown by 550. In this example, the Subscriber_Info and Eligibility_Receiver_Address correspond to an Eligibility Request (for a patient) initiated by client (healthcare provider). The client is responsible for filling out the required patient information to generate a successful request to the payer.

The outputs of the Data Tree Maps 530 and 550 may be sequenced in an order as defined by Sequence 560. As shown in FIG. 5, the outputs represent a GUI facilitator to tie the tree maps to a sequence. The Sequence node represents a sequence rule which allows the user to insert a sequence of mappings. In this example, a sequence of two mappings (steps 1 and 2) is represented.

The user may save the graphing construct illustrated in FIG. 5. Upon a save action, the graphing construct may be validated where the nodes representing segment elements are verified as having valid data and data type relationships. For example, a validation process may start with a backend system attempting to build the configuration submitted or created by the user. The validation process recognizes that each connection input and output has a data type assigned to it on the backend. During the validation process, the backend may attempt to build a corresponding graph object. If a data type is not an acceptable data type, the build process will be halted. For example, the validation process recognizes that a user cannot connect a Subscriber_Info/last_name to the Step1 of the Sequence rule. This would result in a failed validation. The validation process confirms that required inputs and outputs for a node are connected properly and logically, e.g., confirms that the user did not map an element in the wrong place.

An embodiment of the present invention may provide a new mapping based on the payers and transactions that are supported. For example, the system may provide a mapping that corresponds to each X12 transaction or transaction type. In addition, the system may also create recipient specific mappings and mappings with specific requirements. For example, a message may be specific to a particular payer. This payer may require a specific mapping rule that is not addressed by default mapping rules for that transaction. In this scenario, a new mapping rule may be created.

The graphing construct may then be translated into a mapping operation instruction set using EDI Query Language (EQL).

Figure 6:
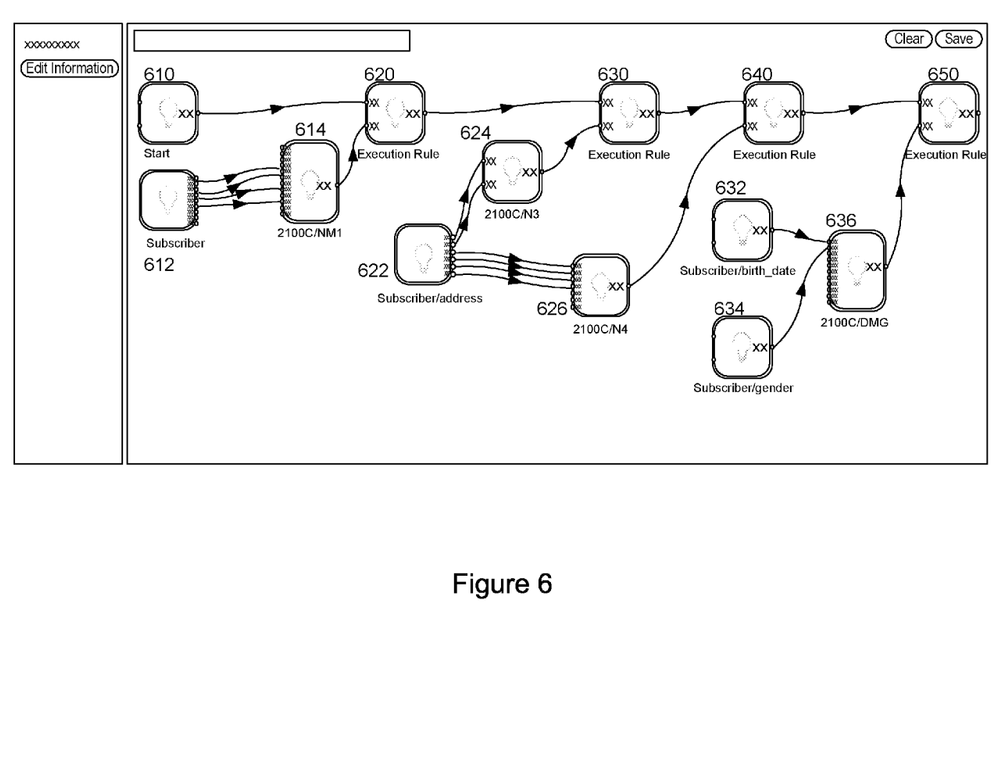
FIG. 6 illustrates an exemplary mapping rule, according to an embodiment of the present invention.

FIG. 6 illustrates an exemplary mapping rule, according to an embodiment of the present invention. FIG. 6 illustrates a graphing construct for a "Map Subscriber" rule. A user may start the graphing construct process at 610. As shown in FIG. 6, Subscriber Information (patient information), as shown by 612, is mapped into their respective places in an X12 node (2100/NM1), as shown by 614. The output is mapped to Execution Rule 1, as shown by 620. Subscriber/address information, as shown by 622 is mapped to X12 node (2100C/N3), as shown by 624 and X12 node (2100C/N4), as shown by 626. The outputs are mapped to Execution Rule 2, as shown by 630, and Execution Rule 3, as shown by 640. Subscriber/birth date information, as shown by 632, and Subscriber/gender information, as shown by 634, are mapped to X12 node (2100C/DMG), as shown by 636. The output is mapped to Execution Rule 4, as shown by 650. This rule is composed of four "Execution Rules" and each contains a mapping of information into a respective X12 address. An "Execution Rule" is a type of "Sequence Rule" where the Execution Rule has a single "step" that is executed. When the rule is saved, the system may assign a rule identifier. The rule identifier may represent an identifier for a rule that includes a structure as shown in FIG. 6. In addition, the final execution rule 650 may have a rule identifier that may be called again as a shorthand for a subsequent greater complex rule as shown in FIG. 8.

Figure 7:
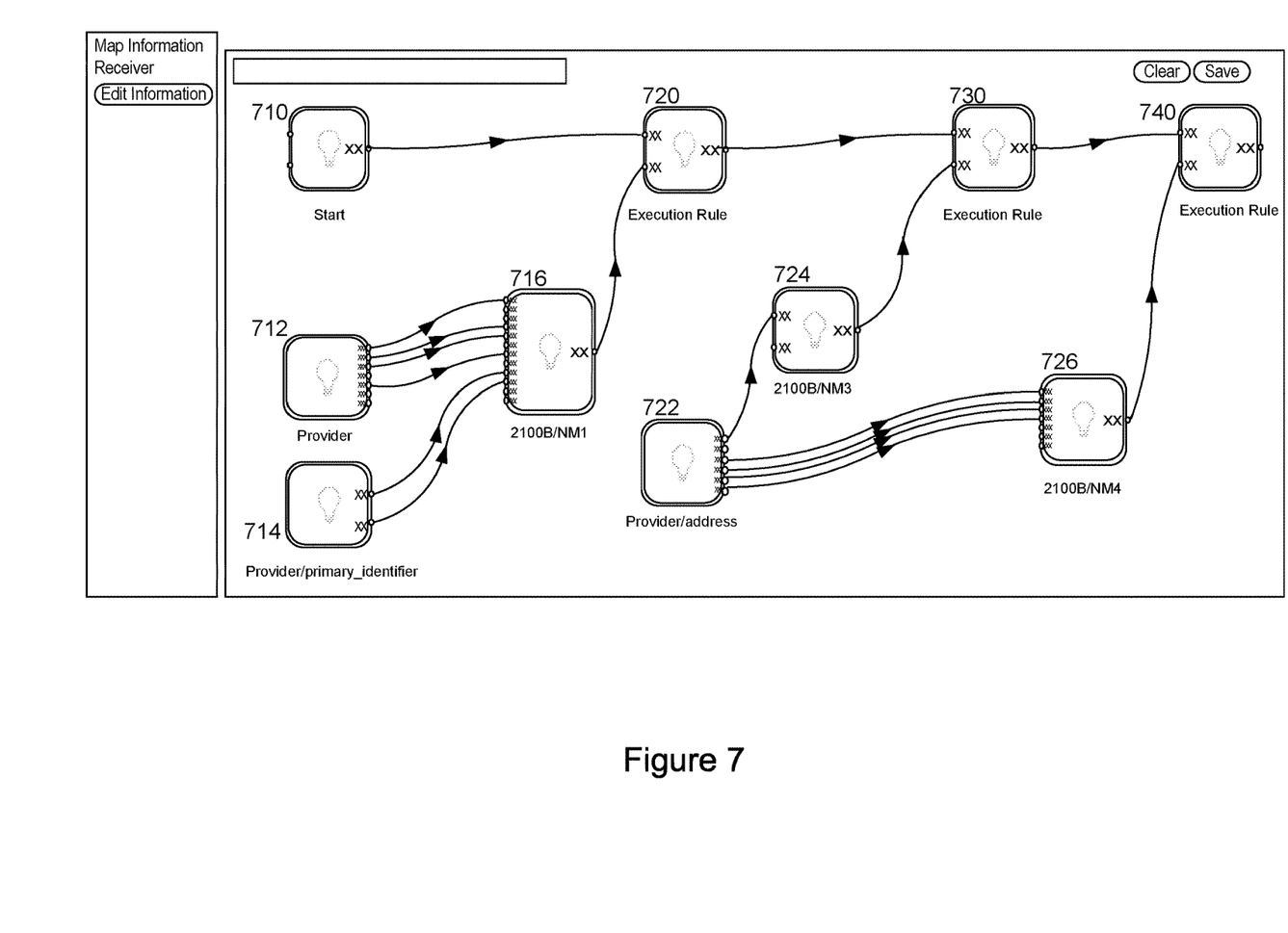
FIG. 7 illustrates an exemplary mapping rule, according to an embodiment of the present invention.

FIG. 7 illustrates an exemplary mapping rule, according to an embodiment of the present invention. A user may start the graphing construct process at 710. FIG. 7 illustrates a graphing construct for a "Map Information Receiver" rule. As shown in FIG. 7, this rule takes information and maps into a corresponding X12 element. Provider information, as shown by 712, and Provider/primary identifier information, as shown by 714, may be mapped to X12 node (2100B/NM1), as shown by 716, where the output is mapped to Execution Rule 1, as shown by 720. Provider/address information, as shown by 722, is mapped to X12 node (2100B/N3), as shown by 724, and X12 node (2100B/N4), as shown by 726. The outputs are mapped to Execution Rule 2, as shown by 730, and Execution Rule 3, as shown by 740.

Figure 8:
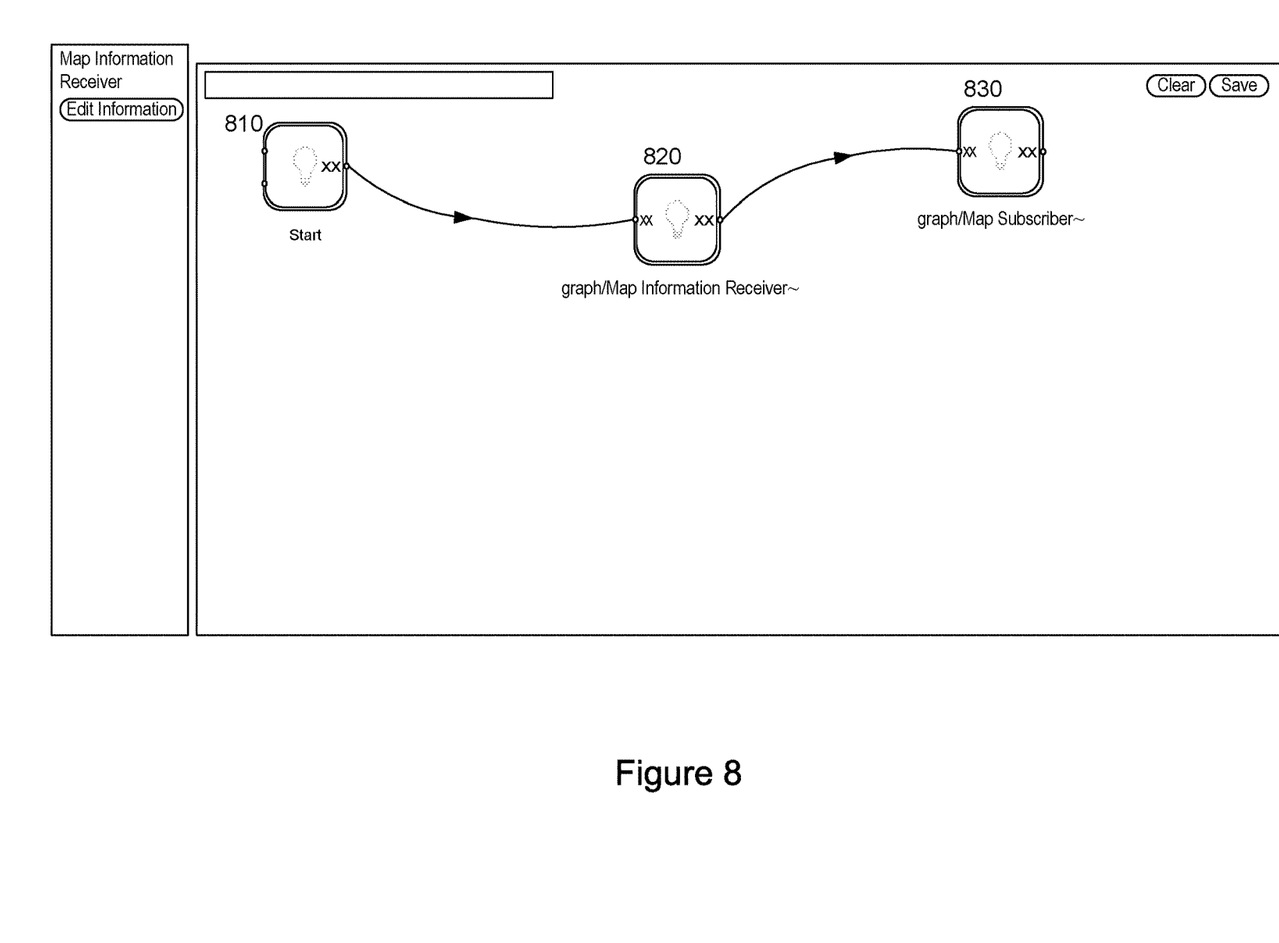
FIG. 8 illustrates a composite rule, according to an embodiment of the present invention.

FIG. 8 illustrates a composite rule, according to an embodiment of the present invention. FIG. 8 illustrates a composite rule that takes two previously saved rules and combines them into another rule. The system allows the user to compose any rule together to create a desired structure. The identifier of the rule may contain a name and a rule identifier. A user may start the graphing construct process at 810 that combines Map Information Receiver 820 and graphing construct Map Subscriber 830.

An embodiment of the present invention may implement a self-learning process. In this scenario, the system may suggest a reconfiguration to the rules depending on various factors, performance and historical data.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations, including a distributed client server configuration, may also be used. According to another embodiment of the invention, various components may be separate entities such as corporations or limited liability companies. Other embodiments, in compliance with applicable laws and regulations, may also be used.

The description above describes communication devices, an application system, a communication network having network elements, storage devices, various networks, and other elements for coupling user via the communication network, some of which are explicitly depicted, others of which are not. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

A communication networks 102, 104 may be coupled to System 110 and one or more communication devices (e.g., user communication devices, etc.). The communication network 106 may be a wireless network, a wired network or any combination of wireless network and wired network. For example, the communication networks 102, 104 may include one or more of a public switched telephone network (PTSN), a signaling system #7 (SS7) network, a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication networks 102, 104 may include, without limitation, telephone line, fiber optics, IEEE Ethernet 802.3, wide area network ("WAN"), local area network ("LAN"), or global network such as the Internet. The communication networks 102, 104 may support an Internet network, a wireless communication network, a cellular network, or the like, or any combination thereof. The communication networks 102, 104 may further include one, or any number of the exemplary types of networks mentioned above operating as a stand-alone network or in cooperation with each other. The communication networks 102, 104 may include a plurality of mobile switching centers (MSCs) and a plurality of signaling control points (SCPs).

The communication networks 102, 104 may utilize one or more protocols of one or more network elements to which it is communicatively coupled. The communication network 106 may translate to or from other protocols to one or more protocols of network devices. Protocols may include internet protocols, e.g., HTTP, HTTPS, etc. Although the communication networks 102, 104 is depicted as one network, it should be appreciated that according to one or more embodiments, the communication networks 102, 104 may comprise a plurality of interconnected networks, such as, for example, a service provider network, the Internet, a broadcaster's network, a cable television network, corporate networks, and home networks.

Data and information may be stored and cataloged in Datastores which may comprise or interface with a searchable data structure. Datastores may comprise, include or interface to a relational database. Other databases, such as a query format database, a Standard Query Language (SQL) format database, a storage area network (SAN), or another similar data storage device, query format, platform or resource may be used. Datastores may comprise a single database or a collection of databases, dedicated or otherwise. In one embodiment, Datastores may store or cooperate with other databases to store the various data and information described herein. In some embodiments, Datastores may comprise a file management system, program or application for storing and maintaining data and information used or generated by the various features and functions of the systems and methods described herein. In some embodiments, Datastores may store, maintain and permit access to customer information, transaction information, account information, and general information used to process transactions as described herein.

System 110 may be accessed by a user communication device, such as a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with an application system and the plurality of communication devices (e.g., computer, wireless mobile communication device, etc.) associated with other users via the communication networks 102, 104.

System 110 may access datastore and/or other sources of information, represented by Datastore 150, 152, 154 in accordance with an embodiment of the present invention. The datastores may reside at a single location as a consolidated data structure or separated through multiple locations. In addition, the datastores may be supported by an independent service provider. For example, an independent service provider may support the one or more datastores and/or other functionality at a remote location. Other architectures may be realized. The components of the exemplary system diagrams may be duplicated, combined, separated and/or otherwise modified, as desired by various applications of the embodiments of the present invention as well as different environments and platforms.

In some embodiments, Datastores 150, 152, 154 may be connected directly to System 110, which, in some embodiments, it is accessible through a network, such as communication network, e.g., 106 illustrated in FIG. 1, for example. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A system for providing a graph that identifies data mapping rules for a data transformation type, the system comprising:
   a display interface configured to present a plurality of distinct node types, each with a distinct location and is displayed at corresponding a first display location, a second display location and a third display location on the display surface, the plurality of distinct node types comprising:
      a first distinct node type that is a pure data type with one or more value output ports;
      a second distinct node type that is a data mapping type with one or more value input ports and at least one output port; and
      a third distinct node type that is a sequence instruction type with one or more stream input ports and at least one output data transform port, wherein the sequence instruction type represents a sequence rule as a guiding parser that sequences a state machine that receives data tree mapping node type outputs and in a designated order constructs a tree of valid segment representations;
   a computer processor that generates a rules configuration representing a graph construct; and
   a memory that stores the rules configuration;
   wherein the display interface is coupled to the computer processor and the memory; and
   wherein the computer processor applies the rules configuration to generate the data mapping rules, generates an in-memory tree structure based on a schema definition for the in-memory tree structure, wherein the schema definition is generated by defining a schema in a visually declarative schema definition language, populates the in-memory tree structure with data received at the one or more value input ports based on the data mapping rules, and transforms the in-memory tree structure into a data structure or object.

2. The system of claim 1, wherein the display interface provides the graphing construct, the display interface is configured to:
   receive a first user input specifying a first drawing of a displayed linkage between a first node type port output and a second node type port input; and
   receive a second user input specifying a second drawing of a displayed linkage between a second node type port output and a third node type port input.

3. The system of claim 2, wherein the display interface is further configured to:
   receive at least a third user input specifying a third drawing of a displayed linkage between an output port of a second data mapping type node and a second input port of the sequence node.

4. The system of claim 2, wherein the display interface is further configured to:
   receive at least a third user input specifying a third drawing of a displayed linkage between an output port of a second sequence node and a second input port of the sequence node.

5. The system of claim 2, wherein the display interface is further configured to:
   receive at least a third user input specifying a third drawing of a displayed linkage between one or more output ports of a second pure data type node and one or more input ports of a second sequence node type.

6. The system of claim 1 wherein an input of a sequence instruction node includes a starting port, where the starting port identifies the start sequencing of data within the sequence instruction node.

7. The system of claim 6, wherein a first input port and a second input port structures the order of the sequencing of data streams as per the sequence instruction node's instructions within the sequence instruction node.

8. The method of claim 1, wherein the computer processor validates the rules configuration based on a schema definition.

9. A method for providing a graph that identifies data mapping rules for a data transformation type, the method comprising the steps of:
   presenting, via a display interface, a plurality of distinct node types, each with a distinct location and is displayed at corresponding a first display location, a second display location and a third display location on the display surface, the plurality of distinct node types comprising:
      a first distinct node type that is a pure data type with one or more value output ports;
      a second distinct node type that is a data mapping type with one or more value input ports and at least one output port; and
      a third distinct node type that is a sequence instruction type with one or more stream input ports and at least one output data transform port, wherein the sequence instruction type represents a sequence rule as a guiding parser that sequences a state machine that receives data tree mapping node type outputs and in a designated order constructs a tree of valid segment representations;
   generating, via a computer processor, a rules configuration representing a graph construct;
   applying, via the computer processor, the rules configuration to generate the data mapping rules;
   generating, via the computer processor, an in-memory tree structure based on a schema definition for the in-memory tree structure, wherein the schema definition is generated by defining a schema in a visually declarative schema definition language;
   populating, via the computer processor, the in-memory tree structure with data received at the one or more value input ports based on the data mapping rules;
   transforming, via the computer processor, the in-memory tree structure into a data structure or object; and
   storing, via a memory, the rules configuration;
   wherein the display interface is coupled to the computer processor and the memory.

10. The method of claim 9, further comprising the steps of:
   receiving a first user input specifying a first drawing of a displayed linkage between a first node type port output and a second node type port input; and
   receiving a second user input specifying a second drawing of a displayed linkage between a second node type port output and a third node type port input.

11. The method of claim 10, further comprising the steps of:

receiving at least a third user input specifying a third drawing of a displayed linkage between an output port of a second data mapping type node and a second input port of the sequence node.

12. The method of claim 10, further comprising the steps of:

receiving at least a third user input specifying a third drawing of a displayed linkage between an output port of a second sequence node and a second input port of the sequence node.

13. The method of claim 10, further comprising the steps of:

receiving at least a third user input specifying a third drawing of a displayed linkage between one or more output ports of a second pure data type node and one or more input ports of a second sequence node type.

14. The method of claim 9, wherein an input of a sequence instruction node includes a starting port, where the starting port identifies the start sequencing of data within the sequence instruction node.

15. The method of claim 14, wherein a first input port and a second input port structures the order of the sequencing of data streams as per the sequence instruction node's instructions within the sequence instruction node.

16. The method of claim 9, further comprising the step of:

validating, via the computer processor, the rules configuration, based on a schema definition.

17. A method for generating a graph that identifies data mapping rules for a transaction type, the method comprising the steps of:

identifying a transaction type;

retrieving, using a computer processor, a set of nodes to construct a graph for the transaction type;

providing, via the graphical user interface, a graphing construct and a plurality of graphing actions; the graphing construct comprising:

an input that selects at least one data node from the set of nodes, the data node having one or more associated data elements;

a linking input that links a data element of the data node to a corresponding input of a relationship node;

a sequence input that identifies a sequence for a plurality of relationship nodes, wherein the sequence for the relationship nodes is of a sequence instruction type that represents a sequence rule as a guiding parser that sequences a state machine that receives data tree mapping node type outputs and in a designated order constructs a tree of valid segment representations;

generating, using the computer processor, a rules configuration representing the graphic construct;

applying, using the computer processor, the rules configuration to generate the data mapping rules;

generating, using the computer processor, an in-memory tree structure based on a schema definition for the in-memory tree structure, wherein the schema definition is generated by defining a schema in a visually declarative schema definition language;

populating, using the computer processor, the in-memory tree structure with data received at the one or more value input ports based on the data mapping rules;

transforming, using the computer processor, the in-memory tree structure into a data structure or object; and storing, in a memory, the rules configuration.

18. The method of claim 17, further comprising the step of:

validating, using the computer processor, the rules configuration, based on a schema definition.

* * * * *